United States Patent
Nakamura et al.

(10) Patent No.: US 8,000,177 B2
(45) Date of Patent: Aug. 16, 2011

(54) READING DEVICE AND READING METHOD FOR AN OPTICAL DATA RECORDING MEDIUM

(75) Inventors: Atsushi Nakamura, Osaka (JP); Naoyasu Miyagawa, Hyogo (JP)

(73) Assignee: Panasonic Corporation, Osaka (JP)

( * ) Notice: Subject to any disclaimer, the term of this patent is extended or adjusted under 35 U.S.C. 154(b) by 326 days.

(21) Appl. No.: 12/303,832

(22) PCT Filed: May 31, 2007

(86) PCT No.: PCT/JP2007/061505
§ 371 (c)(1),
(2), (4) Date: Dec. 8, 2008

(87) PCT Pub. No.: WO2007/145124
PCT Pub. Date: Dec. 21, 2007

(65) Prior Publication Data
US 2010/0226218 A1    Sep. 9, 2010

(30) Foreign Application Priority Data
Jun. 12, 2006 (JP) .................. 2006-162295

(51) Int. Cl.
*G11B 11/00* (2006.01)

(52) U.S. Cl. .................. 369/13.26; 369/47.5; 369/53.26; 369/116

(58) Field of Classification Search .............. 369/13.26, 369/47.5, 53.26, 116
See application file for complete search history.

(56) References Cited

U.S. PATENT DOCUMENTS

| | | | |
|---|---|---|---|
| 5,586,099 | A | 12/1996 | Finkelstein et al. |
| 6,243,339 | B1 | 6/2001 | Spruit et al. |
| 6,256,282 | B1 | 7/2001 | Yamagami et al. |
| 6,421,314 | B1 | 7/2002 | Maruyama |
| 2002/0039335 | A1 | 4/2002 | Masaki et al. |
| 2002/0075789 | A1 | 6/2002 | Katoh et al. |
| 2002/0110063 | A1 | 8/2002 | Yamada et al. |

(Continued)

FOREIGN PATENT DOCUMENTS
EP    1 182 650    2/2002
(Continued)

OTHER PUBLICATIONS
International Search Report issued Aug. 23, 2007 in the International (PCT) Application No. PCT/JP2007/061505.
(Continued)

*Primary Examiner* — Wayne R Young
*Assistant Examiner* — Brenda Bernardi
(74) *Attorney, Agent, or Firm* — Wenderoth, Lind & Ponack, L.L.P.

(57) ABSTRACT

A reading devices suppresses deterioration of the recording marks caused by increasing the output laser power to compensate for a drop in the S/N ratio when reading at a high speed information recorded to a high density recording medium. To read information recorded to an optical data recording medium that is written and read using a laser beam output from a semiconductor laser, the reading method modulates a high frequency current on the drive current of the semiconductor laser to output the laser beam, and changes the light modulation rate according to the selected linear velocity used for reading. The light modulation rate is the ratio Pp/Pave between the peak power Pp and the average read power Pave of the light intensity of the high frequency modulated laser beam.

25 Claims, 9 Drawing Sheets

U.S. PATENT DOCUMENTS

| | | | |
|---|---|---|---|
| 2003/0112732 A1* | 6/2003 | Masui et al. | 369/59.12 |
| 2004/0141448 A1* | 7/2004 | Dekker | 369/59.11 |
| 2004/0222479 A1 | 11/2004 | Uno et al. | |
| 2004/0240350 A1 | 12/2004 | Tanii et al. | |
| 2005/0105418 A1* | 5/2005 | Kuwahara et al. | 369/47.5 |
| 2005/0152247 A1 | 7/2005 | Minechika et al. | |
| 2005/0243675 A1 | 11/2005 | Masaki et al. | |
| 2005/0286390 A1 | 12/2005 | Minemura et al. | |
| 2005/0286392 A1 | 12/2005 | Kamei | |
| 2006/0141202 A1 | 6/2006 | Suenaga | |
| 2006/0250918 A1* | 11/2006 | Hsu et al. | 369/59.11 |
| 2007/0053262 A1* | 3/2007 | Kikugawa et al. | 369/47.28 |
| 2007/0183283 A1 | 8/2007 | Tanii et al. | |
| 2010/0165804 A1* | 7/2010 | Spruit et al. | 369/47.5 |

FOREIGN PATENT DOCUMENTS

| | | |
|---|---|---|
| EP | 1 193 696 | 4/2002 |
| EP | 1 471 506 | 10/2004 |
| EP | 1 477 970 | 11/2004 |
| EP | 1 609 615 | 12/2005 |
| EP | 1 936 611 | 6/2008 |
| JP | 5-217193 | 8/1993 |
| JP | 10-228645 | 8/1998 |
| JP | 11-96602 | 4/1999 |
| JP | 11-353685 | 12/1999 |
| JP | 2000-149302 | 5/2000 |
| JP | 2003-067931 | 3/2003 |
| JP | 2003-99948 | 4/2003 |
| JP | 2003-308624 | 10/2003 |
| JP | 2004-355723 | 12/2004 |
| JP | 2004-362748 | 12/2004 |
| JP | 2005-529442 | 9/2005 |
| JP | 2007-004914 | 1/2007 |
| JP | 2007-134003 | 5/2007 |
| JP | 2007-172770 | 7/2007 |
| JP | 2007-265596 | 10/2007 |
| JP | 2007-280464 | 10/2007 |
| RU | 2 229 171 | 5/2004 |
| WO | 03/105139 | 12/2003 |
| WO | 2004/038711 | 5/2004 |
| WO | 2007/043406 | 4/2007 |

OTHER PUBLICATIONS

Written Opinion of the International Searching Authority issued Aug. 23, 2007 in the International (PCT) Application No. PCT/JP2007/061505.

European Search Report issued Dec. 20, 2010 in Application No. EP 10 18 7488.

Russian Decision on Grant issued Apr. 25, 2011 in Russian Application No. 2008151764/28(068034).

European Search Report issued May 27, 2011 in European Application No. EP 10 18 7489.

* cited by examiner

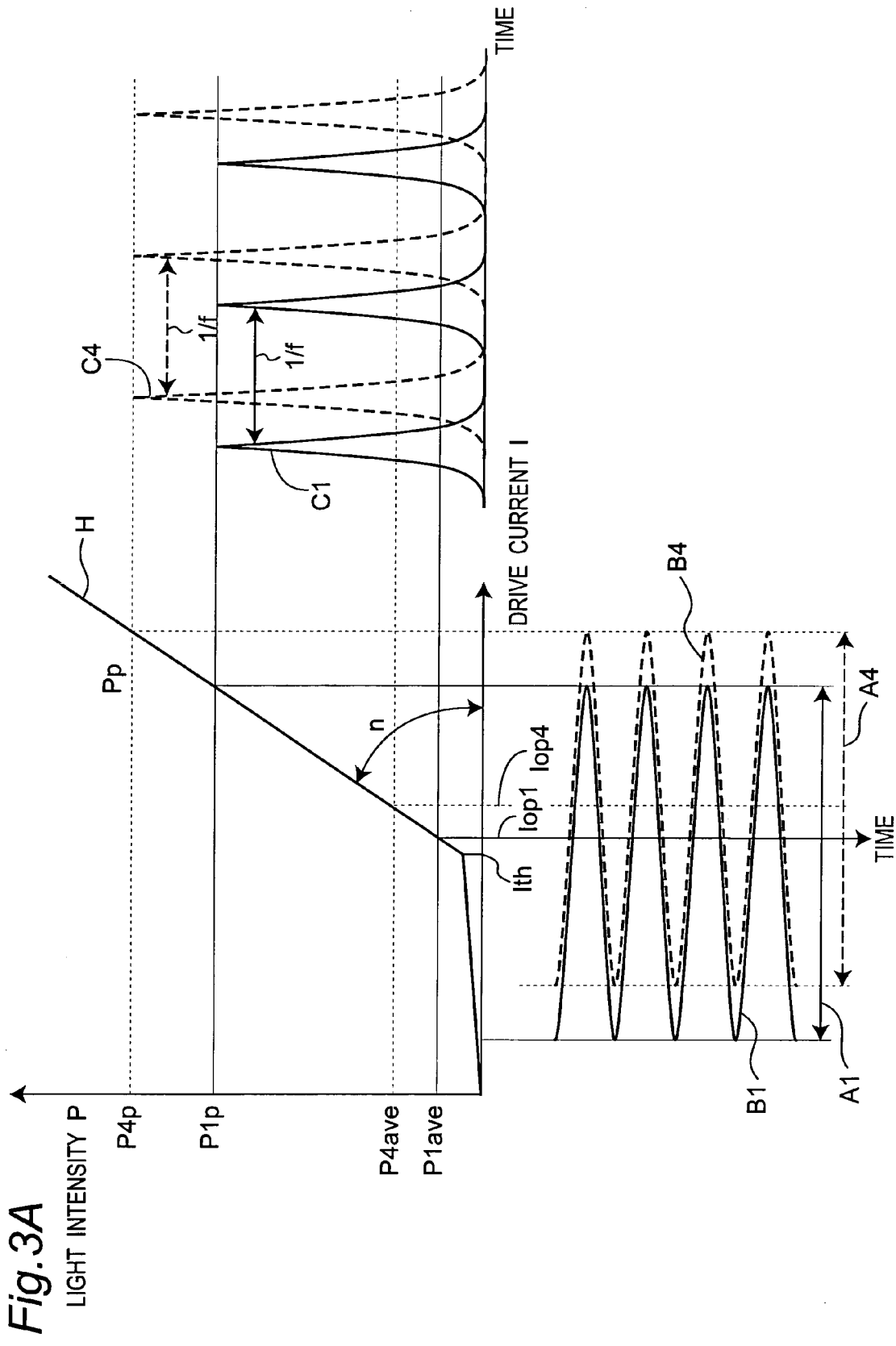

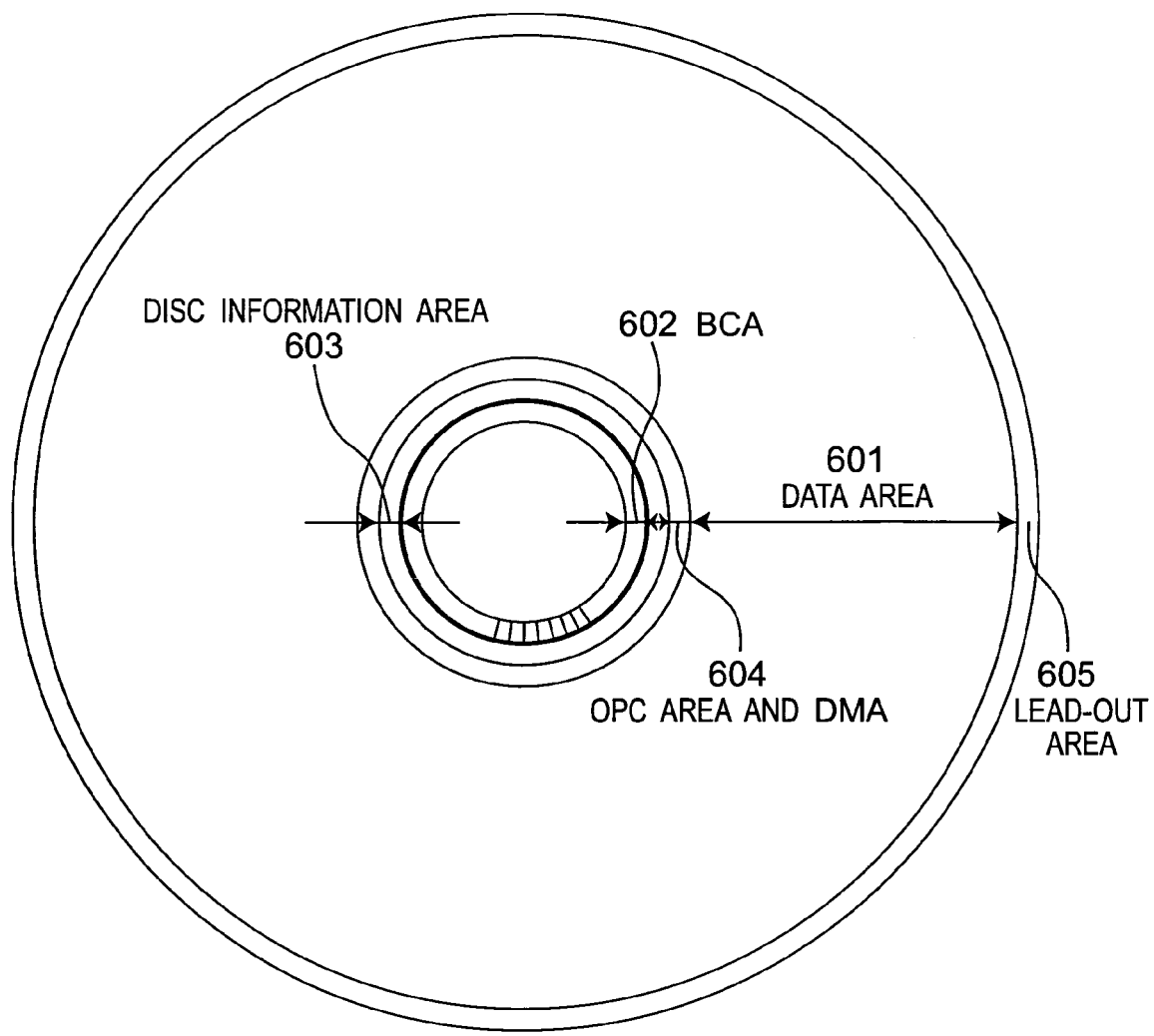

READING DEVICE AND READING METHOD FOR AN OPTICAL DATA RECORDING MEDIUM

TECHNICAL FIELD

The present invention relates to a reading device and a reading method for reproducing information from an optical data recording medium used for high density recording of information such as digital video information.

BACKGROUND ART

Examples of high density, large capacity recording media include Blu-ray discs (BD), digital versatile discs (DVD), video discs, and various kinds of discs used for document storage. Such optical data recording media ("optical discs" below) are recorded with a pit and land pattern using optical memory technologies. Optical memory technology has also been adapted for storing data files.

Methods of further increasing optical disc recording density are also being studied. One such method involves increasing the numerical aperture (NA) of the objective lens used for reading and/or writing. The objective lens focuses a laser beam on the optical disc to form a light spot at the diffraction limit. Generally speaking, the energy density of the focused light increases as the beam spot diameter of the optical disc decreases. However, data recorded on write-once optical discs and rewritable optical discs is read by focusing a laser beam with less power than is required to erase the marks and pits written on the disc. The laser emission power used to read such discs is therefore limited.

To increase the data transfer rate during recording and reading, the rotation speed of the disc and channel bit rate have also been increased. In general, rewritable optical discs that conform to the DVD or BD standards have a phase change recording layer that changes between crystalline and amorphous states. Such media are recorded by focusing a powerful laser beam by means of the objective lens onto the recording film of the optical disc to raise the temperature of the recording film above the melting point and then rapidly cooling the melted spot to form a non-crystalline (amorphous) recording mark. When a laser beam that is powerful enough to raise the temperature of the recording film to near the melting point is focused on the recording film, the temperature of the recording film where the spot is focused rises above the crystallization temperature and then gradually cools in the crystallized state. By using this phase change property of the recording film and modulating the power of the laser beam using a binary recording signal (NRZI), data (recording marks) can be recorded and erased and a rewritable recording medium is achieved.

Differences in the optical characteristics, such as reflectivity, of the crystalline and amorphous phases of the recording film are used to read information from the optical disc. More specifically, the laser beam is focused at a low power level (the average read power Pave of the laser beam) on the recording film and the change in reflected light is detected to produce an analog read signal from the recorded data. A digital signal processing circuit such as a PRML (partial response maximum likelihood) circuit then digitizes the analog read signal, and an error correction circuit applies error correction and demodulation processing to acquire the desired information.

A write-once optical disc can be produced by forming the recording film using a Te—O-M material (where M is a metallic element, a dielectric element, or a semiconductor element). This type of write-once optical disc is taught in Japanese Unexamined Patent Appl. Pub. JP-A-2004-362748, for example. The Te—O-M material used as the recording material is a material containing Te, O, and M, and immediately after film formation is an alloy having a uniform distribution of Te, Te-M, and M particles in the $TeO_2$ matrix. When a laser beam is emitted to a film made from such a material, the film melts and Te or Te-M crystals with a large crystal diameter are deposited. Differences in the optical states of the parts of the recording film exposed to the laser beam and the unexposed parts of the film can also be detected as a signal from such discs, and this characteristic can be used to render a write-once optical disc that can only be written one time.

In order to read rewritable and write-once optical discs such as described above, a high frequency modulation circuit modulates a high frequency signal of several hundred megahertz on the drive current of the semiconductor laser. This is to prevent a drop in the S/N ratio of the read signal as a result of light reflected back from the optical disc increasing noise in the laser beam.

Methods of preventing the drop of the S/N ratio of the read signal by using high frequency modulation to suppress an increase in noise caused by reflection of the laser beam are further described below.

Japanese Unexamined Patent Appl. Pub. JP-A-2004-355723 teaches a method of changing the amplitude of the high frequency signal modulated on the laser beam when reading according to the type of optical disc. The optical disc drive taught in JP-A-2004-355723 changes the amplitude of the high frequency signal modulated on the drive signal for driving the semiconductor laser according to the identified type of the optical information recording medium.

Japanese Unexamined Patent Appl. Pub. JP-A-2000-149302 teaches a method of changing the modulated frequency and amplitude of the output power of the semiconductor laser according to the operating mode of the optical disc drive, that is, whether the optical disc drive is reading or writing the disc.

If a laser beam with the small spot size needed to read or write a high density disc is used to read or write a low density optical disc, the servo signal is distorted because the spot size of the focused laser beam is small compared with the size of the recording marks and guide track pitch. To solve this problem of recording and reading at least two different types of optical discs with different recording densities, Japanese Unexamined Patent Appl. Pub. JP-A-H10-228645 teaches a method by controlling the high frequency modulated current to modulate the drive current more when reading and writing optical discs with a low recording density than when reading and writing optical discs with a high recording density.

Japanese Unexamined Patent Appl. Pub. JP-A-2003-308624 teaches a method of calculating the differentiation efficiency of semiconductor laser drive from the current driving the semiconductor laser, and setting the amplitude of the high frequency current according to the calculated differentiation efficiency. When the differentiation efficiency of the semiconductor laser varies or the differentiation efficiency of the semiconductor laser changes over time, the method taught in JP-A-2003-308624 enables always superimposing the optimal minimum required high frequency current and reducing power consumption and extraneous radiation. JP-A-2003-308624 also teaches a method of controlling the high frequency modulation means to determine the amplitude of the high frequency current appropriate to the calculated drive differentiation efficiency by selecting from among a plurality of preset high frequency current amplitude levels, and modulate a high frequency current of the selected amplitude.

When the linear velocity of the optical disc is increased in order to improve the data transfer rate of the optical disc, the bandwidth of the read signal increases and the S/N ratio of the signal decreases. If high frequency noise emitted from the circuits is a concern, a drop in the S/N ratio where the bandwidth increases can be compensated for by increasing the laser emission power when reading according to the linear velocity. However, the recorded marks or pits may be erased on a write-once optical disc or rewritable optical disc if the laser output power is increased when reading, and the reliability of the recorded data cannot be maintained.

To solve this problem, the method of the invention enables improving the S/N ratio of the read signal to reproduce information from an optical data recording medium such as an optical disc without erasing the recording marks by the laser beam when the linear velocity of the disc is increased.

DISCLOSURE OF INVENTION

A first aspect of the invention is a reading method for reproducing information from a recording medium that can be read at a plurality of linear velocities by superimposing a high frequency current on a drive current to drive a semiconductor laser which emits a laser beam onto the recording medium, the reading method having steps of: selecting one linear velocity from among the group of plural linear velocities; and changing a light modulation rate according to the selected linear velocity where the light modulation rate (Pp/Pave) is a ratio between the peak power (Pp) and the average read power (Pave) of the light intensity of the emitted laser beam.

Preferably, the selecting step selects a first linear velocity (Lv1) or a second linear velocity (Lv2) that is at least two times greater than the first linear velocity; the light modulation rate for reading at the first linear velocity (Lv1) is a first light modulation rate (Mod1); the light modulation rate for reading at the second linear velocity (Lv2) is a second light modulation rate (Mod2); and the second light modulation rate (Mod2) is lower than the first light modulation rate (Mod1) (Mod2<Mod1).

Preferably, the first linear velocity (Lv1), the second linear velocity (Lv2), the first light modulation rate (Mod1), and the second light modulation rate (Mod2) are set so that the following equation (1)

$$(Lv2/Lv1)^{1/2} \geq (Mod1/Mod2) \geq 1 \quad (1)$$

is true.

Preferably, the average read power of the high frequency modulated laser beam for reading at the first linear velocity (Lv1) is a first average read power (Pr1); the average read power of the high frequency modulated laser beam for reading at the second linear velocity (Lv2) is a second average read power (Pr2); and the first linear velocity (Lv1), the second linear velocity (Lv2), the first light modulation rate (Mod1), the second light modulation rate (Mod2), the first average read power (Pr1), and the second average read power (Pr2) are set so that the following equation (2)

$$(Lv2/Lv1)^{1/2} \geq (Pr2 \times Mod2)/(Pr1 \times Mod1) \geq 1 \quad (2)$$

is true.

Preferably, the recording medium enables reading information at any linear velocity selected from a group including at least the first linear velocity (Lv1) and the second linear velocity (Lv2), the first average read power (Pr1) and the second average read power (Pr2) are prerecorded to the recording medium, and the reading method also has a step of reading the average read power information from the recording medium.

Preferably, the recording medium enables reading information at any linear velocity selected from a group including at least the first linear velocity (Lv1) and the second linear velocity (Lv2), the first light modulation rate (Mod1) and the second light modulation rate (Mod2) are prerecorded to the recording medium, and the reading method also has a step of reading the light modulation rate information from the recording medium.

Preferably, the erase power for recording spaces at the first linear velocity (Lv1) is a first erase power (Pe1); the erase power for recording spaces at the second linear velocity (Lv2) is a second erase power (Pe2); and the first light modulation rate (Mod1), the second light modulation rate (Mod2), the first erase power (Pe1), and the second erase power (Pe2) are set so that the following equation (3)

$$(Pe2/Pe1) \geq (Mod1/Mod2) \geq 1 \quad (3)$$

is true.

Preferably, the average read power of the laser beam for reading at the first linear velocity (Lv1) is a first average read power (Pr1); the average read power of the laser beam for reading at the second linear velocity (Lv2) is a second average read power (Pr2); the erase power for recording spaces at the first linear velocity (Lv1) is a first erase power (Pe1); the erase power for recording spaces at the second linear velocity (Lv2) is a second erase power (Pe2); and the first light modulation rate (Mod1), the second light modulation rate (Mod2), the first average read power (Pr1), the second average read power (Pr2), the first erase power (Pe1), and the second erase power (Pe2) are set so that the following equation (4)

$$(Pe2/Pe1) \geq (Pr2 \times Mod2)/(Pr1 \times Mod1) \geq 1 \quad (4)$$

is true.

Preferably, the recording medium enables reading information at any linear velocity selected from a group including at least the first linear velocity (Lv1) and the second linear velocity (Lv2), and the first erase power (Pe1) and the second erase power (Pe2) are prerecorded to the recording medium, and the reading method also has a step of reading the erase power information from the recording medium.

Preferably, the ratio (Lv2/Lv1) between the first linear velocity (Lv1) and the second linear velocity (Lv2) is at least 4, and the light modulation rate changes according to the linear velocity.

Preferably, the recording medium is a rewritable or a write-once medium. Further preferably, the reading method also has a step of reading the light modulation rate from a table when the selected linear velocity is substantially constant in all areas of the recording medium.

Preferably, the reading method also has a step of calculating the median between the light modulation rate for one set linear velocity and the light modulation rate for the next set linear velocity to determine the light modulation rate for a linear velocity that deviates from a set linear velocity that is a specific multiple of a reference linear velocity when the selected linear velocity is a linear velocity that increases with proximity to the outside circumference edge of the recording medium.

Another aspect of the invention is a reading device for reproducing information from a recording medium that can be read at a plurality of linear velocities by superimposing a high frequency current on a drive current to drive a semiconductor laser which emits a laser beam onto the recording medium, the reading device having: a means for selecting one linear velocity from among the group of plural linear velocities; and a means for changing a light modulation rate according to the selected linear velocity where the light modulation rate (Pp/Pave) is a ratio between the peak power (Pp) and the average read power (Pave) of the light intensity of the emitted laser beam.

Preferably, the means for changing the light modulation rate includes: a high frequency superimposing unit for superimposing a high frequency on the semiconductor laser drive current; a laser drive unit for driving the semiconductor laser; and a high frequency modulation control unit for changing the light modulation rate according to the linear velocity when reading the recording medium where the ratio between the peak power (Pp) and the average read power (Pave) of the light intensity of the high frequency modulated laser beam is the light modulation rate (Pp/Pave).

Another aspect of the invention is a recording medium that can be read at a plurality of linear velocities and contains disc information that can be read by a device where the disc information records: information relating to the plurality of linear velocities, the average read power of the laser beam when reading the recording medium at each linear velocity, and the amplitude of the modulated current when reading the recording medium at each linear velocity.

EFFECT OF THE INVENTION

As described above, when reproducing information from an optical data recording medium the invention changes the degree of modulation applied by the high frequency modulation current according to the linear velocity of the disc when reading, and enables increasing the average laser power more desirably when reading. The method and device of the invention therefore prevent the problematic drop in the S/N ratio resulting from an increase in the read signal bandwidth when reading at a high linear velocity, improve the signal quality of the read signal, and achieve a good read error rate without undesirably erasing the recorded mark by the reading laser having the average laser power.

BRIEF DESCRIPTION OF DRAWINGS

FIG. 3A is a graph showing the relationship between the drive current I (x-axis) and optical output power P (y-axis) of the laser when reading.

FIG. 6 is a plan view showing the space allocation of the optical data recording medium.

BEST MODE FOR CARRYING OUT THE INVENTION

Figure 1:
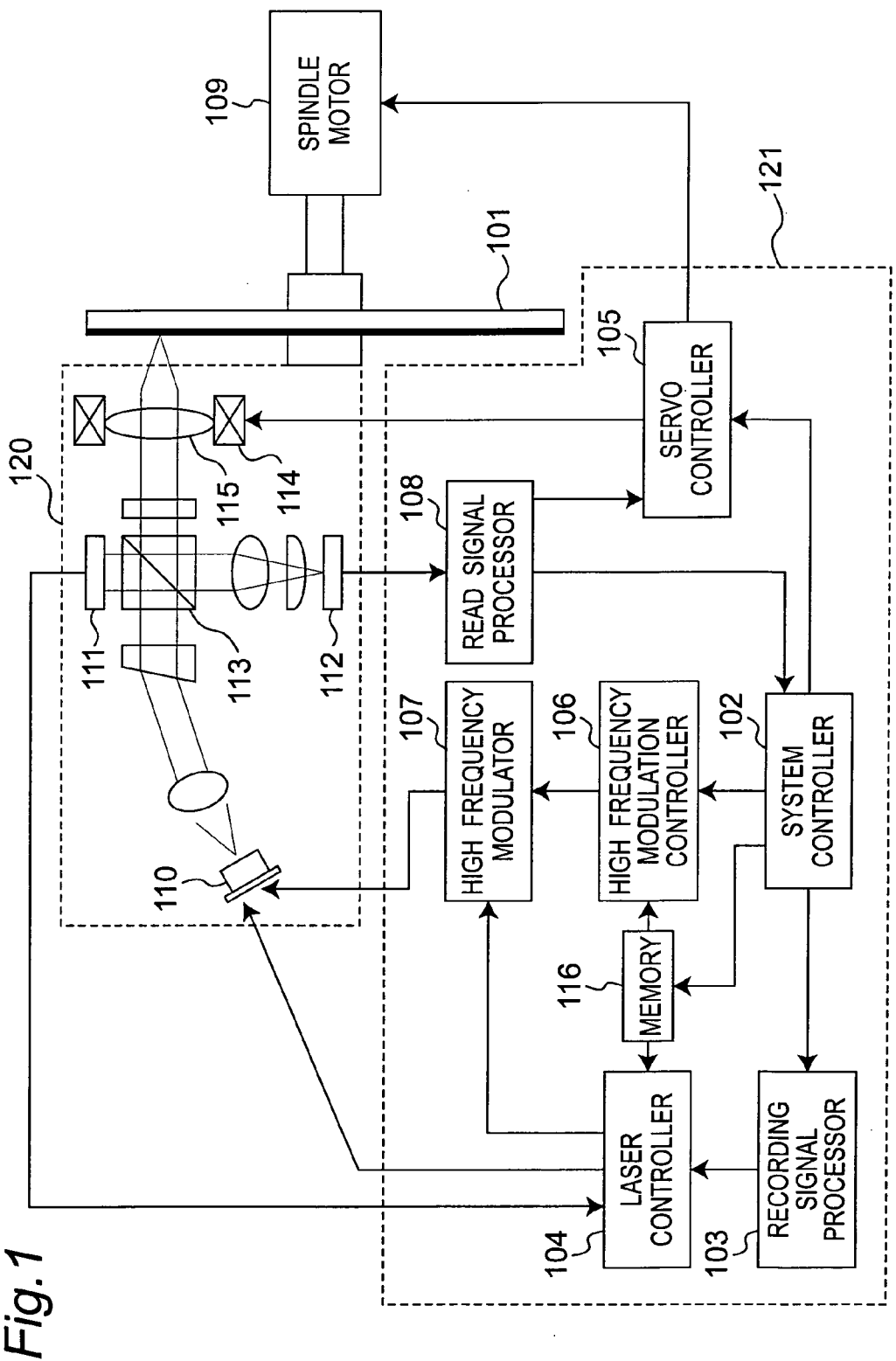
FIG. 1 is a block diagram of a reading device for an optical data recording medium according to a preferred embodiment of the invention.

Preferred embodiments of the present invention are described below with reference to the accompanying figures.

Optical data recording media are generally disc-shaped media ("optical discs" herein). Optical disc types broadly include read-only media, write-once media enabling data to be written only once, and rewritable media enabling data to be overwritten multiple times. The invention applies primarily to a write-once type disc enabling data to be written only once, a rewritable type disc enabling data to be overwritten multiple times, or an optical disc of read-only type.

An example of a rewritable optical disc enabling data to be overwritten multiple times is the BD-RE (Blu-ray Disc Rewritable) disc described below. In the preferred embodiment described herein, the following parameters features are used. Laser wavelength, 405 nanometers; Objective lens numerical aperture, NA=0.85; Optical disc track pitch, 0.32 micrometers; Phase change type optical disc having a single or dual recording layers with the incident laser beam being injected from the same side of the disc, and the depth of the recording layers being 75 to 100 micrometers; Modulation being a 17PP (Party Preserve/Prohibit RMTR (Repeated Minimum Transition Runlength)) modulation; Minimum mark length (2T) of the recording mark being 0.149 micormeter; Recording capacity of one recording layer being 25 GB, —with dual layer being 50 GB—; Channel clock frequency for the BD standard speed (1×) being 66 MHz (BD4× being 264 MHz, and BD8× being 528 MHz); and Standard linear velocity being 4.917 meter/second.

BD-RE media record information using a phase change recording film by illuminating a laser beam. A blue-violet laser with a wavelength of approximately 405 nm is emitted for reading and writing. Information is reproduced by reading changes in reflectivity produced by the presence or absence of recording marks formed by a laser beam as a digital signal. More specifically, to record on BD-RE media a high power laser beam (laser power Pw) is focused on the recording film of the optical disc by an objective lens to raise the temperature of the recording film to at least the melting point, and the melted portion is then rapidly cooled to form a non-crystalline (amorphous) recording mark. To erase a previously recorded mark and eventually forming a space, the laser is focused on the recording film at an erase power level (laser power Pe) that is strong enough to heat the recording film to near the melting point. When erasing, the amorphous part of the recording film is heated by laser beam Pe to the crystallization temperature, thus causing a phase change from amorphous to crystalline and erasing the mark. By thus modulating the power of the laser beam between Pw and Pe based on a binary recording signal, information (recording marks) can be recorded to and erased from the BD-RE disc.

An example of write-once media that can only be written once is the BD-R (Blu-ray Disc Recordable) disc described below.

Various materials can be used to make the recording layer of BD-R media. The write-once disc described below is assumed to use an inorganic material containing Te—O-M for the recording layer where M is at least one of a metallic element, a dielectric element, and a semiconductor element, and is preferably Pd. The Te—O-M material constituting the recording layer contains Te, O, and M, and immediately after film formation is an alloy having a uniformly random distribution of Te, Te-M, and M particles in the $TeO_2$ matrix. When a laser beam is emitted to a film made from such a material, the film melts and Te or Te-M crystals with a large crystal diameter are deposited. The optical states of the parts of the recording film exposed to the laser beam and the unexposed parts of the film are different. These differences can be detected as a signal. This characteristic of the Te—O-M material can be used to render a write-once optical disc that can only be written one time. Information is reproduced by emitting a laser beam to read the change in reflectivity caused by the presence or absence of these recording marks as a digital signal.

FIG. 6 is a plan view showing the areas allocated on the surface of the optical disc. The data surface of this optical disc is divided from the inside circumference to the outside circumference into a burst cutting area BCA 602, a disc information area 603, an OPC (Optimum Power Control) area and defect management area DMA 604, a data area 601, and a lead-out area 605. Areas 602, 603, and 604 are together called the lead-in area.

The optical disc is basically recorded and read at a nominal linear velocity of 4.917 m/s. This nominal linear velocity is referred to as a linear velocity of 1×. An optical disc that can be recorded and read at twice (2×) the nominal linear velocity can be manufactured by using materials with a faster reaction speed (faster crystallization speed) to form the recording layer of the optical disc. Optical discs that can be recorded and read at a maximum linear velocity of once (1×), twice (2×), four times (4×), eight times (8×), or twelve times (12×) the nominal linear velocity can thus be realized by selecting the appropriate materials used in the recording layer.

An optical disc with a maximum linear velocity of 4×, for example, can also be recorded and read at slower speeds of 1× and 2×. Information describing the linear velocity that can be used for recording and reading, and the recording power Pw, erase power Pe, and reproducing power (read-power) Pr of the laser beam at each linear velocity is recorded in the lead-in area of each optical disc. Because the reproducing power (read-power) Pr used for reading is equal to an average read power obtained by time integrating the reproducing power Pr for a predetermined unit time, it is also referred to as the average read power Pave.

The following information is recorded in the lead-in area of an optical disc with a maximum usable linear velocity of 1×.
  1×, P1$w$, P1$e$, P1$ave$ The following information is prerecorded in the lead-in area of an optical disc with a maximum usable linear velocity of 2×.
  1×, P1$w$, P1$e$, P1$ave$
  2×, P2$w$, P2$e$, P2$ave$ The following information is recorded in the lead-in area of an optical disc with a maximum usable linear velocity of 4×.
  1×, P1$w$, P1$e$, P1$ave$
  2×, P2$w$, P2$e$, P2$ave$
  4×, P4$w$, P4$e$, P4$ave$ The following information is recorded in the lead-in area of an optical disc with a maximum usable linear velocity of 8×.
  1×, P1$w$, P1$e$, P1$ave$
  2×, P2$w$, P2$e$, P2$ave$
  4×, P4$w$, P4$e$, P4$ave$
  8×, P8$w$, P8$e$, P8$ave$ The following information is recorded in the lead-in area of an optical disc with a maximum usable linear velocity of 12×.
  1×, P1$w$, P1$e$, P1$ave$
  2×, P2$w$, P2$e$, P2$ave$
  4×, P4$w$, P4$e$, P4$ave$
  8×, P8$w$, P8$e$, P8$ave$
  12×, P12$w$, P12$e$, P12$ave$ The optimum value of each of these values can be obtained in advance for each type of media separately by reading information from each media, and recorded in memory 116 in the reading device described below. Alternatively, such an optimum value can be obtained by test writing and learning process, conducted by the recording apparatus, using a rewritable area in the lead-in area of the disc.

FIG. 1 is a block diagram showing the arrangement of the reading and writing device for optical data recording media (referred to below as an optical disc) according to a preferred embodiment of the invention. As shown in FIG. 1 the reading device has a spindle motor 109 for rotationally driving the optical disc 101. The reading device also has a system controller 102, a recording signal processor 103, a laser controller 104, a servo controller 105, a high frequency modulation controller 106, memory 116, a high frequency modulator 107, and a reproduced signal processor 108. The optical module 120 denoted in FIG. 1 by the dotted line inside the optical pickup includes a semiconductor laser 110, a laser power detector 111, an optical photo detector 112, a polarized beam splitter 113, an objective lens actuator 114, and an objective lens 115. The parts 102, 103, 104, 105, 106, 107, 108, and 116 inside dotted line 121 in FIG. 1 are rendered on an IC chip.

This optical disc reading and writing device is described in further detail next.

The reproduced signal processor 108 reads a reproduced signal from the optical disc, and particularly reads the maximum linear velocity information from the lead-in area in this embodiment of the invention.

The servo controller 105 gets the maximum linear velocity information read from the lead-in area, and based on this maximum linear velocity information controls the rotational speed of the spindle motor 109. The servo controller 105 controls the speed of the spindle motor 109 so that the rotational speed of the disc decreases according to the radial position of the laser spot on the disc as the laser spot moves from the inside circumference to the outside circumference on a constant linear velocity (CLV) optical disc. The servo controller 105 preferentially selects the maximum linear velocity read from the lead-in area, but a linear velocity that is slower than the maximum linear velocity can also be selected based on user input received through an operating unit (not shown in the figure). The servo controller 105 controls the rotational speed (rpm) of the spindle motor 109 to the selected linear velocity.

The system controller 102 receives the selected linear velocity data from the reproduced signal processor 108 and also receives the power level corresponding to the selected linear velocity, that is, recording power Pw, erase power Pe, or average read power Pave, from the reproduced signal processor 108. The selected linear velocity is the preferentially selected maximum linear velocity or the linear velocity selected by the user. The system controller 102 controls the servo controller 105, which controls focusing and tracking, so that the laser beam spot traces a guide track formed as a pregroove on the optical disc 101. The servo controller 105 also controls the spindle motor 109 to control the rotational velocity of the optical disc 101.

In the recording mode the recording signal processor 103, memory 116, and the laser controller 104 operate according to signals from the system controller 102 to emit the laser and write data to the optical disc.

In the read mode the high frequency modulation controller 106, memory 116, the laser controller 104, and the high frequency modulator 107 operate according to signals from the system controller 102 to emit the laser and read data that was previously written on the optical disc.

The laser beam emitted from the semiconductor laser 110 passes an optical path including a collimator lens and the polarized beam splitter 113, and is focused by the objective lens 115 on the recording film of the optical disc 101.

Part of the laser beam emitted from semiconductor laser 110 is reflected by the polarized beam splitter 113 onto the laser power detector 111.

The laser power detector 111 detects the power of the laser beam, converts the power of the incident light to an electric signal, and outputs this electric signal to the laser controller 104.

The laser controller 104 compares the electric signal from the laser power detector 111 with a predetermined target value and controls the drive current applied to the semiconductor laser 110 so that the deviation between the detected laser power and the target value goes to zero. More specifically, this consists a feedback loop that keeps the power of the semiconductor laser 110 constant.

The laser beam reflected from the optical disc 101 passes back through the objective lens 115 and is incident to the polarized beam splitter 113. The incident light is reflected and split by the polarized beam splitter 113 depending on the direction of laser beam polarization, and the split beam is incident to the photo detector 112.

The laser beam incident to the photo detector 112 is photoelectrically converted, and the photo detector 112 outputs an electric signal that is proportional to the amount of light incident to each of the photoreception areas of the photo detector 112.

The reproduced signal processor 108 then applies a specific operation to this electric signal to output a focus error signal FE, a tracking error signal TE, and a reproduced signal RF signal. The servo controller 105 uses the focus error signal and tracking error signal to drive the objective lens actuator 114 to compensate for disc warp and eccentricity.

Reading the disc information is described next.

In order to read the disc information, the optical pickup first reads the BCA 602 and the disc information area 603 at the inside circumference part of the disc. The reflected light is converted to an electric signal by the photo detector 112, and the reproduced signal processor 108 converts the reproduced signal (RF signal) to a binary signal by means of a signal processing circuit including a PRML (partial response maximum likelihood) circuit, and outputs the resulting digital signal to the system controller 102.

The system controller 102 then applies error correction and demodulation processes, and stores the prerecorded disc information including the disc type (BD-R or BD-RE), maximum linear velocity (1×, 2×, 4×, and so forth), recording pulse conditions, and laser power conditions to memory in the system controller 102. The disc information is read out by the photo detector 112, the reproduced signal processor 108, and the system controller 102, and these parts together function as a discrimination unit.

The recording mode is described next.

In the recording mode the system controller 102 first gets a signal denoting the selected linear velocity, and a signal denoting the erase power and the recording power corresponding to the selected linear velocity from the optical disc, and passes these signals to the recording signal processor 103.

The recording signal processor 103 also gets a binary recording data train (NRZI signal) of 0s and 1s from a recording data generating unit not shown. The recording signal processor 103 then generates a recording pulse train based on this recording data, and outputs the recording signal to the laser controller 104. If the selected linear velocity is 4×, for example, the recording signal processor 103 generates a recording pulse train denoting erase power 4 and write pulse 4 denoted by dotted lines in FIG. 2, and outputs the recording signal to the laser controller 104. Note that this erase power 4 is a signal denoting a 0 mark and write pulse 4 is a signal denoting a 1 mark.

Figure 2:
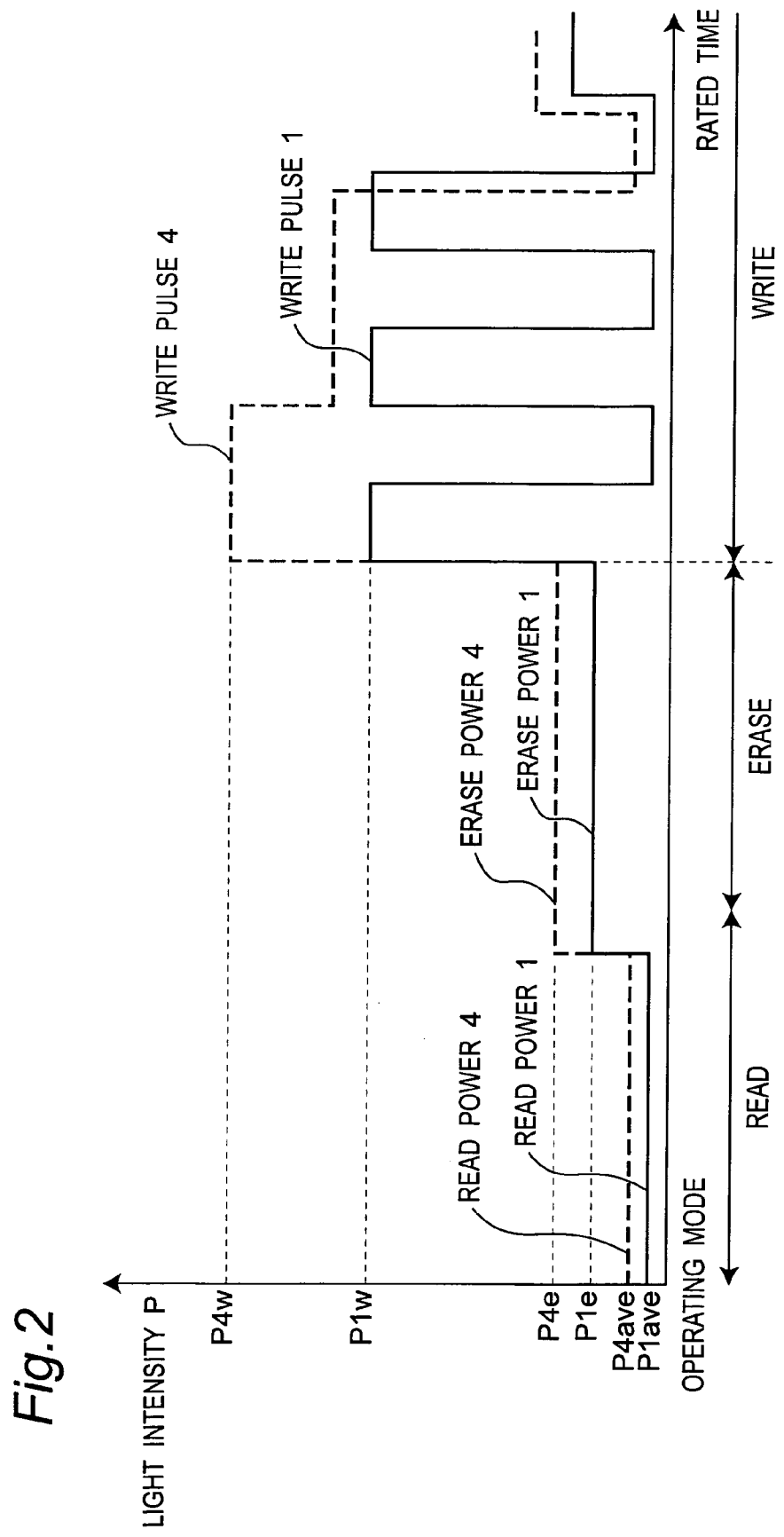
FIG. 2 is a graph showing the read power, erase power, and recording power of the laser.

In FIG. 2 erase power 1 denoted by a solid line corresponds to linear velocity 1× and laser power of P1e, while erase power 4 denoted by, the dotted line corresponds to linear velocity 4× and laser power of P4e. The laser power data is read from the optical disc. Optimum values previously written to memory 116 could alternatively be used. Further alternatively, the optimum values of the recording power as obtained by test writing in the rewritable area in the lead-in area of the disc, using the values read from disc as initial values, could be used. The write pulse 1 denoted by solid line in FIG. 2 similarly corresponds to linear velocity 1× and is a multiple pulse recording pulse that uses laser power P1w. Write pulse 4 denoted by the dotted line corresponds to linear velocity 4× and is a so-called castle-shaped recording pulse that is used at laser power P4w. Unlike during the read mode described below, the erase power and write pulse signals used in the recording mode do not have a modulated high frequency signal.

The laser controller 104 outputs the laser drive signal to drive the semiconductor laser 110 based on the recording signal containing erase power 4 pulses and write pulses 4. This causes the laser to emit. When the laser emits at the erase power level, previously recorded marks are erased and a 0 is recorded. When a write pulse is output, a mark is written on the disc and a 1 is recorded. A train of 0s and 1s is thus written by alternately driving the laser at the erase power and write pulse levels.

The read mode is described next.

In the read mode the system controller 102 sends a signal denoting the selected linear velocity to the memory 116. The memory 116 stores the following table.

TABLE 1

|  | Pave(mW) | Modulated current amplitude (mA) |
| --- | --- | --- |
| 1X | P1ave = 0.30 | A1 |
| 2X | P2ave = 0.35 | A2 = A1 |
| 4X | P4ave = 0.60 | A4 = A1 |
| 8X | P8ave = 0.80 | A8 < A1 |
| 12X | P12ave = 1.00 | A12 = A8 |

Table 1 stores the average read power (reproducing power) target and the amplitude of the modulated current for each linear velocity. Instead of the average read power, a corresponding laser drive current Iop can be stored. The peak laser power (Pp) for each linear velocity could also be included in Table 1, in which case the peak laser power (Pp) could be written instead of the amplitude of the modulated current. As will be known from table 1, the modulated current amplitude decreases or remains the same as the average read power Pave rises.

The memory 116 reads the average read power Pave and modulated current amplitude for the selected linear velocity from Table 1. If the selected linear velocity is 4×, for example, the memory 116 outputs 0.60 mW as the average read power Pave and outputs A4 mA as the modulated current amplitude. The average read power Pave during reading could be the value read from Table 1, the value read from the disc, or the test and learned value by the recording apparatus. This embodiment of the invention uses the value Pave read from Table 1.

The average read power 0.60 mW read form the table is therefore passed to the laser controller 104, and the modulated current amplitude A4 is sent to the high frequency modulation controller 106. The high frequency modulation controller 106 generates a high frequency signal defined by the frequency and current amplitude. The frequency of a high frequency signal to be modulated in this embodiment of the invention is a predetermined value, such as 400 MHz, and the current amplitude is the modulated current amplitude A4 read from memory. The high frequency modulation controller 106 outputs the resulting high frequency signal to the high frequency modulator 107. The laser controller 104 outputs the drive current DC corresponding to the average read power Pave to the high frequency modulator 107.

The high frequency modulator 107 then modulates the high frequency signal on the drive current DC, and outputs a high frequency signal shifted drive current DC to the semiconductor laser 110.

FIG. 3A shows the I-L operating characteristics of the semiconductor laser 110 where curve H is the semiconductor laser characteristic. If the drive current is less than threshold value Ith, there is substantially no output from the semiconductor laser, but if the drive current is greater than the threshold value Ith, a laser with a 405 nm wavelength and laser power substantially proportional to the current is output.

In the relationship of laser drive current I to laser output power P shown in FIG. 3A, if the dc level of the drive current required to achieve the average read power Pave when reading the disc is Iop, a uniform drive current dc level Iop will be achieved once average read power Pave is set. The drive current Iop required to output the laser at the read level can be easily determined (or can be easily set) when the output of the laser power detector 111, which detects part of the laser beam (this part being a fixed ratio of the laser output), goes to a predetermined level (or so that it goes to a predetermined level). The threshold value Ith is the point where the output of the laser power detector 111 rises sharply, and can also be easily determined (or can be easily set).

The amplitude A of the high frequency current to be modulated can be determined from the drive current DC level (Iop) and the threshold value (Ith) during output at the read level. It is known from the literature that high frequency current amplitude equal to or greater than a specific level is required in order to obtain a good noise characteristic when superimposing a high frequency signal to the laser beam. As a result, the frequency and amplitude of the high frequency current affording the effect of high frequency signal modulation under the worst-case scenario considering aging and deviation in the semiconductor laser characteristics are therefore generally determined when the read device is manufactured and stored in the memory 116.

The median current level of the DC-shifted high frequency signal B1 (solid line) is set to Iop1. When this DC-shifted high frequency signal B1 (solid line) is applied to the semiconductor laser 110, the laser is output in the area where the current of the high frequency signal B1 (solid line) is greater than threshold value Ith. Laser output at this time is denoted by curve C1 (solid line). The average read power of output laser C1, being averaged by a predetermined unit time, at this time is P1ave. This average read power P1ave is identical to the average read power P1ave shown in FIG. 2. That is, the dc level of the high frequency signal can be set to approximately Iop1 in order to produce output laser C1 of average read power P1ave. When the laser controller 104 gets average read power P1ave from memory 116, the laser controller 104 generates the corresponding drive current DC level Iop1 using a predetermined equation or a lookup table.

Note that to drive the actual average read power to the targeted average read power, the laser power detector 111 monitors the actual laser output power and the laser controller 104 applies automatic power control (APC). Laser output C1 is the optimum laser output when the linear velocity is 1×.

The light modulation rate Mod is used in this aspect of the invention as the parameter for determining the optimum laser output C1.

Figure 4:
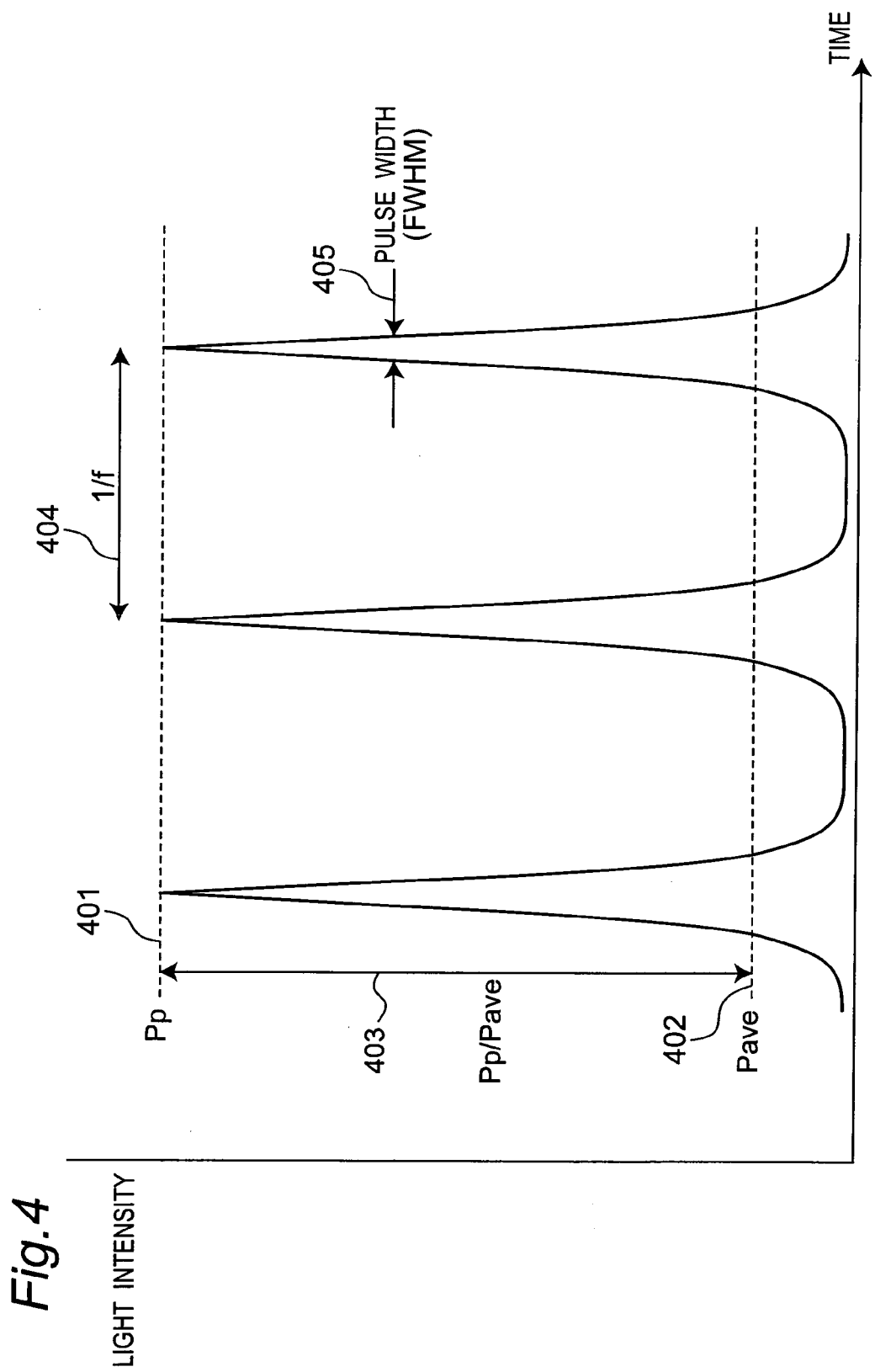
FIG. 4 is a graph of the laser beam when a high frequency signal is modulated.

FIG. 4 is a graph of the laser beam when a high frequency signal is modulated wherein reference numeral 401 denotes the peak laser power Pp output of the high frequency signal, reference numeral 402 denotes the average read power Pave of the laser beam averaged per time unit, reference numeral 403 denotes the light modulation rate Mod, which is the ratio of the peak laser power Pp to the average read power Pave (Mod=Pp/Pave), reference numeral 404 denotes the light modulation period (1/f: f being a frequency), and reference numeral 405 denotes the full width at half maximum (FWHM) of the high frequency modulation. In this aspect of the invention the FWHM 405 is 300 ps. In the case of a Blu-ray Disc where the linear velocity is 1×, the light modulation rate is set to 7 (MOD1=7). This is achieved by setting the modulated current amplitude A1 and the median current level Iop1. The median current level Iop1 is determined from the average read power P1ave using the characteristics curve H of the semiconductor laser. The light modulation rate MOD1=7 used as the target can therefore be achieved by desirably setting the average read power P1ave and modulated current amplitude A1.

Note that MOD1, MOD2, and so forth as used herein denote the modulation rate for a specific value while Mod denotes the modulation rate in general. In addition, Mod1 and Mod2 used below denote the light modulation rate for any two selected linear velocities.

This aspect of the invention is arranged so that the light modulation rate changes according to the linear velocity. Preferably, the average read power Pave and modulated current amplitude are set so that the light modulation rate decreases as the linear velocity increases. More preferably, the light modulation rate decreases when the linear velocity increases above a predetermined linear velocity. More specifically, when the linear velocity increases, the average read power preferably increases while the modulated current amplitude remains the same or decreases.

Table 2 shows the same average read power (Pave) and modulated current amplitude shown in Table 1 together with the light modulation rate. The modulated current amplitude can be omitted from Table 2. Furthermore, the values shown in the table are by way of example only, and the invention is not limited to these values.

TABLE 2

| | Pave (mW) | Modulated current amplitude (mA) | Light modulation rate |
|---|---|---|---|
| 1X | P1ave = 0.30 | A1 | MOD1 = 7 |
| 2X | P2ave = 0.35 | A2 = A1 | MOD2 = 7 |
| 4X | P4ave = 0.60 | A4 = A1 | MOD4 = 4.0 |
| 8X | P8ave = 0.80 | A8 < A1 | MOD8 = 3.5 |
| 12X | P12ave = 1.00 | A12 = A8 | MOD12 = 3.0 |

Table 2 can be stored in memory 116 instead of Table 1. The content of Table 1 or Table 2 can also be written to the disc information of the recording medium. If Table 1 or Table 2 is recorded in the disc information, the table content read from the disc information can be written to memory 116. If the selected linear velocity is substantially constant at all radial positions (CLV media), the light modulation rate can be read from Table 2. As will be known from Table 2, the light modulation rate decreases or remains the same when the average read power Pave rises.

FIG. 3A also shows the high frequency signal B4 and the resulting laser output C4 when the linear velocity is 4×. Compared with the amplitude A1 of high frequency signal B1, the amplitude A4 of high frequency signal B4 is the same but the median level rises to lop4. This is because the average read power rises from P1*ave* to P4*ave*. It will thus be apparent that when the linear velocity rises four times from 1× to 4×, the light modulation rate Mod decreases from 7 to 4.

Figure 3B:
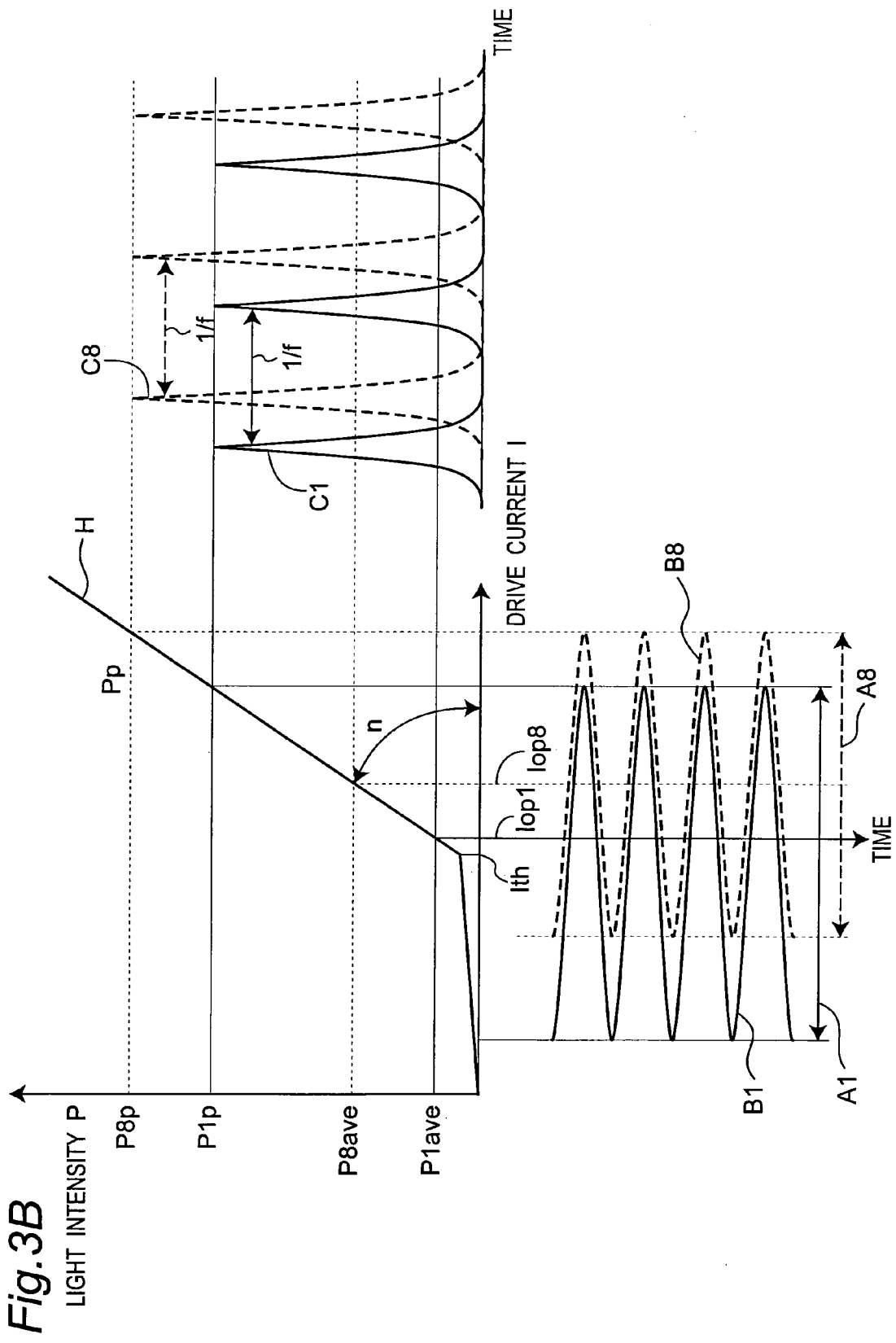
FIG. 3B is another graph showing the relationship between the drive current I (x-axis) and optical output power P (y-axis) of the laser when reading.

FIG. 3B also shows the high frequency signal B1 and the resulting laser output C1 when the linear velocity is 1×, and the high frequency signal B8 and the resulting laser output C8 when the linear velocity is 8×. Compared with the amplitude A1 of high frequency signal B1, the amplitude A8 of high frequency signal B8 decreases but the median level rises to lop8. This is because the average read power rises from P1*ave* to P8*ave*. It will thus be apparent that when the linear velocity rises eight times from 1× to 8×, the light modulation rate Mod decreases from 7 to 3.5.

It will thus be apparent that in the read mode the laser controller 104 outputs a constant drive current DC level, such as lop1 and lop4, equivalent to the average read power Pave that is used as the read level. The drive current DC level also changes to lop1, lop2, lop4, lop8, lop12 as the linear velocity changes to 1×, 2×, 4×, 8×, 12× where lop1<lop2<lop4<lop8<lop12.

In addition, the high frequency signal amplitude changes to A1, A2, A4, A8, A12 as the linear velocity changes to 1×, 2×, 4×, 8×, 12× where

A1≧A2≧A4≧A8≧A12.

Even if the linear velocity changes, the frequency f of the high frequency signal to be modulated is maintained the same, i.e., 400 MHz. This relationship between frequency and amplitude is shown by way of example in a preferred embodiment of the invention, but the invention is not so limited.

Based on the selected linear velocity 1×, 2×, 4×, 8×, 12× sent from the system controller 102, the high frequency modulation controller 106 controls the amplitude of the high frequency signal and the laser controller 104 controls the dc level.

The high frequency modulator 107 then modulates the high frequency signal from the high frequency modulation controller 106 and the dc level signal from the laser controller 104 to drive the semiconductor laser 110.

The semiconductor laser 110 is then driven by the laser controller 104 and outputs a 405 nm wavelength laser beam.

Figure 5A:
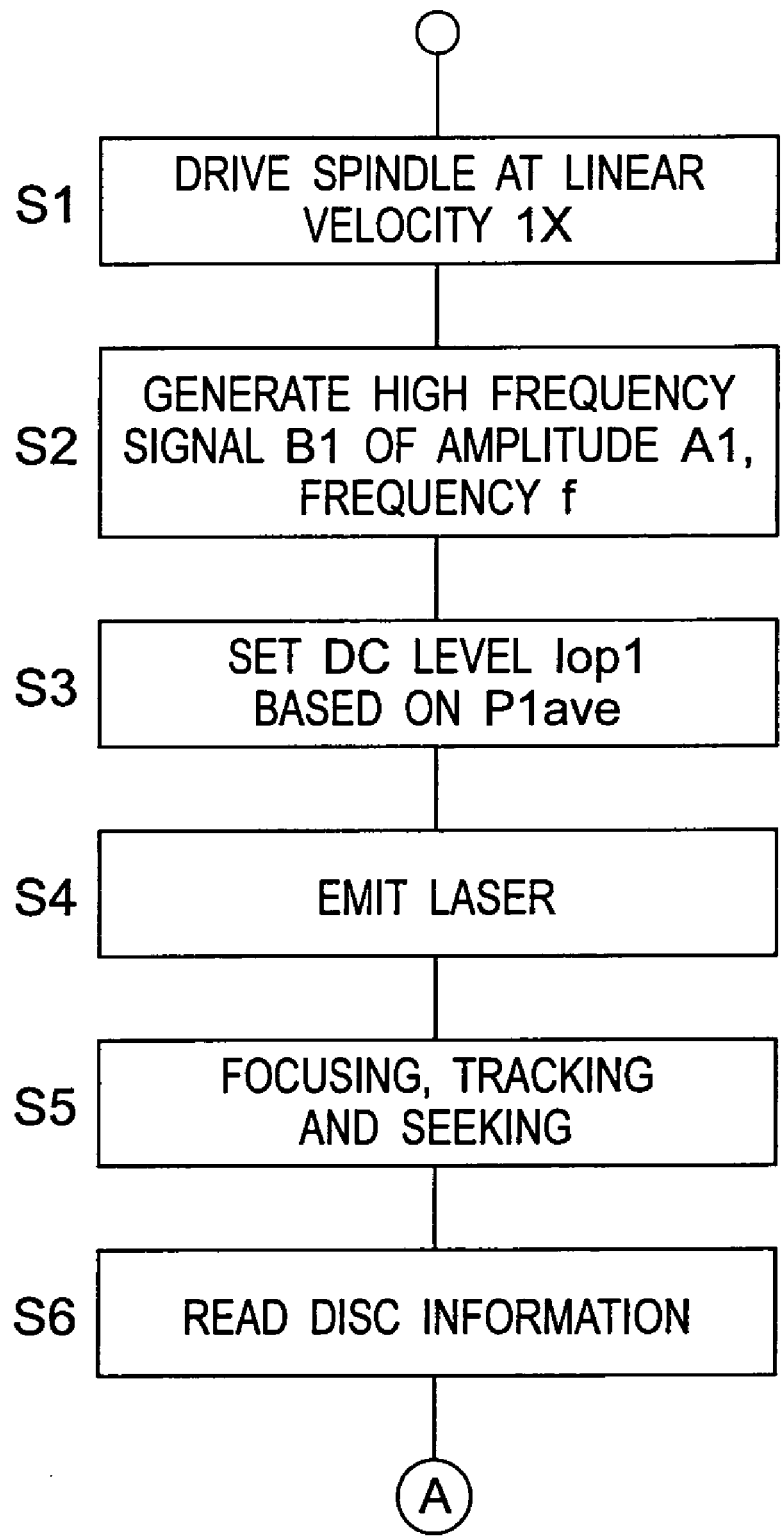
FIG. 5A is a flow chart describing the operation of the reading device according to a preferred embodiment of the invention.
Figure 5B:
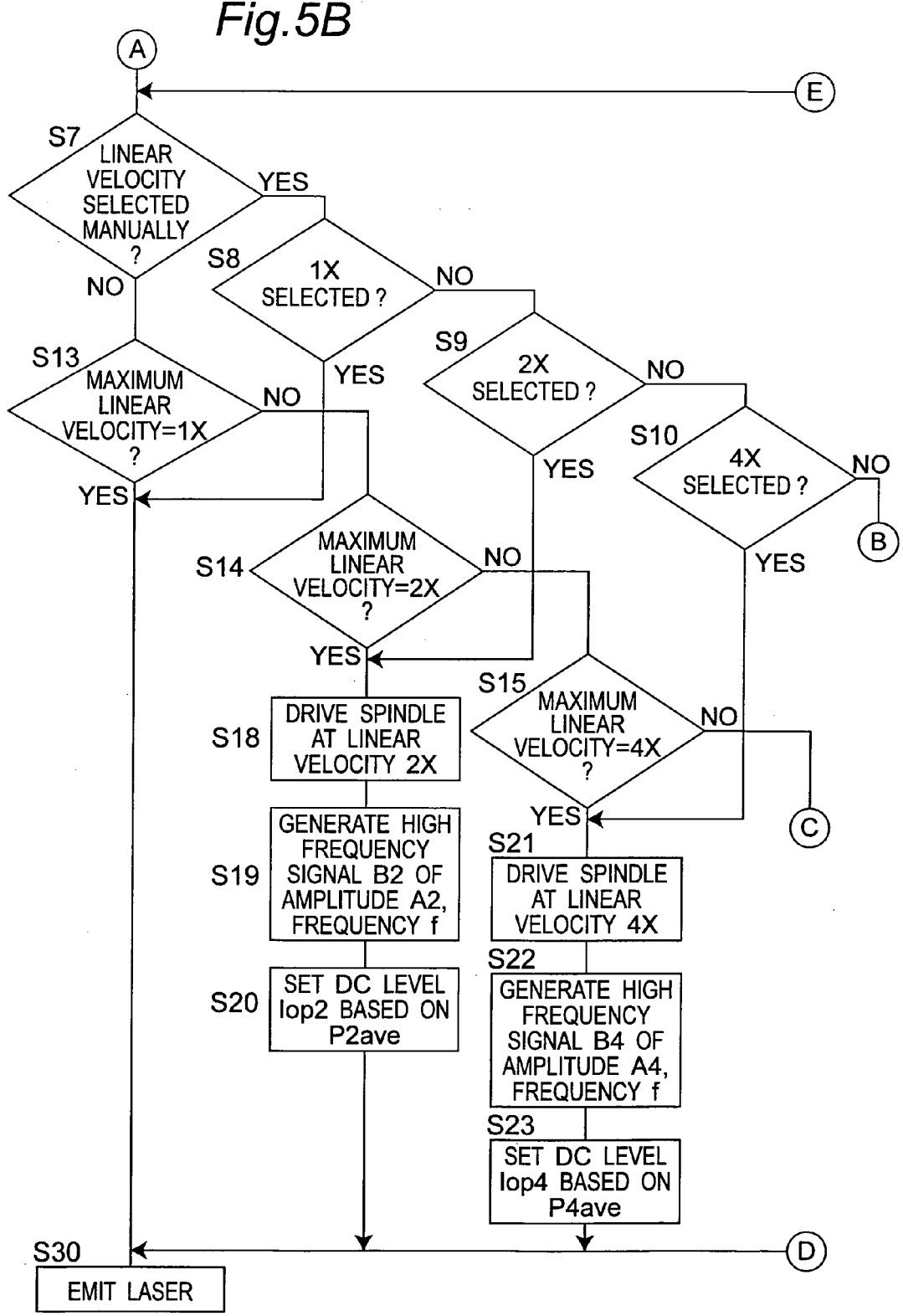
FIG. 5B continues the flow chart describing the operation of the reading device according to a preferred embodiment of the invention.
Figure 5C:
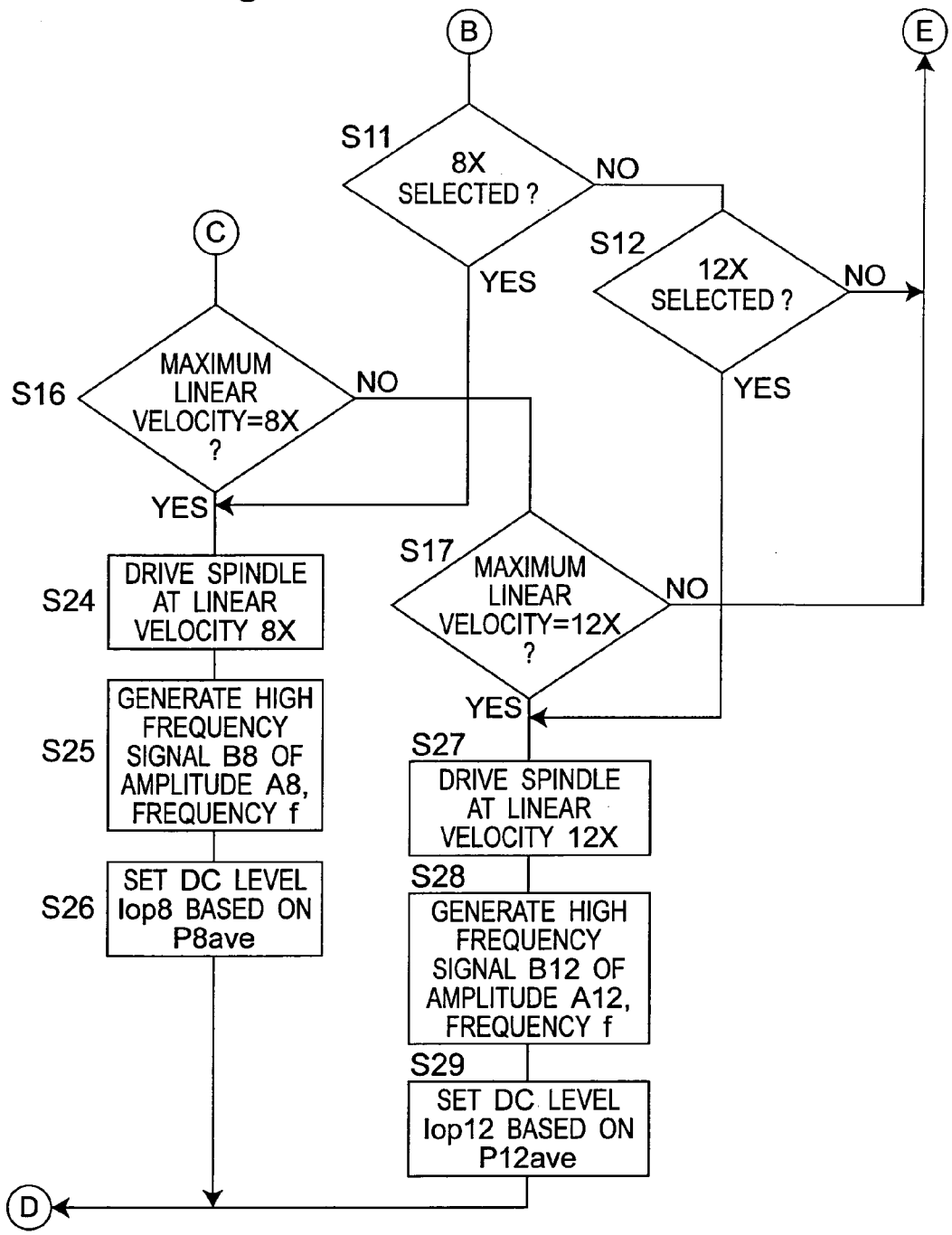
FIG. 5C continues the flow chart describing the operation of the reading device according to a preferred embodiment of the invention.

The operation of the optical disc reading device according to this embodiment of the invention is described next with reference to the flow chart shown in FIG. 5A, FIG. 5B, and FIG. 5C. Note that indices A to E in these figures denote where the flow charts connect to each other.

When the optical disc is loaded into the optical disc drive, the spindle starts turning at the reference linear velocity 1× (step S1). The speed of the spindle motor is determined from the linear velocity and the radial position of the laser spot emitted from the pickup onto the optical disc, and the spindle motor is controlled so that the linear velocity is constant.

In step S2 the high frequency modulation controller 106 generates the high frequency signal B1 based on the modulated current amplitude A1 corresponding to the linear velocity 1× and a specific frequency f (400 MHz).

In step S3, the laser controller 104 sets the dc level lop1 based on the average read power P1*ave* at linear velocity 1×. This step S3 prepares for setting the light modulation rate to MOD1 (=7).

In step S4 the high frequency modulator 107 modulates high frequency signal B1 and dc level lop1 to drive the semiconductor laser 110 which thereupon emits the laser beam.

Focusing and track seeking occur in step S5.

In step S6 the disc information recorded on the optical disc is read. The read disc information is stored to memory 116.

Step S7 then decides if the linear velocity was manually selected. If step S7 returns Yes, control goes to step S13. Otherwise, control goes to step S13.

Step S13 decides if the maximum linear velocity of the optical disc is 1×. If step S13 returns Yes, control goes to step S30 and laser output continues. If step S13 returns No, control goes to step S14 to determine if the maximum linear velocity of the optical disc is 2×. If the answer is Yes, control goes to step S18. If the answer is No, control goes to step S15.

In step S18 the spindle is driven at linear velocity 2×.

In step S19 the high frequency modulation controller 106 outputs the high frequency signal B2 at the amplitude A2 and frequency f corresponding to the linear velocity 2×.

In step S20 the laser controller 104 sets the dc level lop2 based on the average read power P2*ave* at linear velocity 2×. Step S20 prepares for setting the light modulation rate to MOD2 (=7).

Steps S15, S21, S22, and S23 are basically the same as steps S14, S18, S19, and S20 except that the operation corresponds to linear velocity 4×. Step S23 thus prepares to set the light modulation rate to MOD4 (=4.0).

Steps S16, S24, S25, and S26 are basically the same as steps S14, S18, S19, and S20 except that the operation corresponds to linear velocity 8×. Step S26 thus prepares to set the light modulation rate to MOD8 (=3.5).

Steps S17, S27, S28, and S29 are basically the same as steps S14, S18, S19, and S20 except that the operation corresponds to linear velocity 12×. Step S29 thus prepares to set the light modulation rate to MOD12 (=3.0).

In step S30 the laser is output under the conditions set in step S20, S23, S26, or S29.

If step S7 returns Yes, steps S8, S9, S10, S11, and S12 determine whether the manually set linear velocity is 1×, 2×, 4×, 8×, or 12× and operation proceeds at the maximum linear velocity of step that returns Yes. If the manually set linear velocity is 4×, for example, step S10 passes control to step S21, that is, the operation continuing from the Yes determination of step S15.

In the above described embodiment, operations related to the linear velocity of 8× and 12× are controlled under the constant angular velocity (CAV). In such a case, the maximum linear velocity can be set (selected) when the reading/recording head seeks to a predetermined radial position to attain a predetermined linear velocity.

If the rotating linear velocity of the optical disc is increased from 1× to 4×, for example, the read power is increased while the light modulation rate Mod(=Pp/Pave) at the peak laser power Pp and the average read power Pave is reduced when reading. For example, if the light modulation rate is 7 when the linear velocity is 1× and average read power P1*ave* is 0.30 mW, and the light modulation rate is 4 when the linear velocity is 4× and average read power P4*ave* is 0.60 mW, the peak power Pp is 0.30 mW×7=2.1 mW at 1×, is 0.60 mW×4=2.4 mW at 4×, and the peak laser power at 4× is less than if the light modulation rate remained set to 7.

Because the light energy emitted to a unit area per unit time is approximately ¼ at high disc speeds (such as 4×), the temperature of the recording layer does not rise directly proportionally even if the momentary peak laser power Pp rises and will reach the temperature at which the recording layer melts. More specifically, the light energy is proportional to the ½-1 power of the linear velocity multiple.

For example, if the optical disc is read at a first linear velocity Lv1 and a second linear velocity Lv2 where Lv1 and Lv2 are a desirable linear velocity and Lv2≧Lv1, equation (1) below is preferably true.

$$(Lv2/Lv1)^{1/2} \geq (\text{Mod}1/\text{Mod}2) \geq 1 \quad (1)$$

where first light modulation rate Mod1 is the light modulation rate when reading at the first linear velocity Lv1, and second light modulation rate Mod2 is the light modulation rate when reading at the second linear velocity Lv2.

Furthermore, if the average read power when reading at the first linear velocity Lv1 is first average read power Pave1, and the average read power when reading at the second linear velocity Lv2 is second average read power Pave2, Lv1, Lv2, Mod1, Mod2, Pave1, and Pave2 are preferably set so that equation (2) below is true.

$$(Lv2/Lv1)^{1/2} \geq (Pr2 \times \text{Mod}2)/(Pr1 \times \text{Mod}1) \geq 1 \quad (2)$$

The product of Pave and Mod is the peak laser power and equation (2) can be rewritten as equation (2').

$$(Lv2/Lv1)^{1/2} \geq Pp2/Pp1 \geq 1 \quad (2')$$

where Pp2 is the peak laser power when reading at Lv2, and Pp1 is the peak laser power when reading at Lv1

Alternatively to changing the light modulation rate according to the average read power (the read power level) at each linear velocity recorded in the disc information, the erase power Pe used to write spaces during recording could be read and the light modulation rate could be switched based on the ratio to the space power level at each linear velocity. For example, the erase power Pe1 used to write spaces when recording at the first linear velocity Lv1, and the erase power Pe2 used to write spaces when recording at the second linear velocity Lv2, are read from the disc information prerecorded on the disc, and the light modulation rate and laser output power when reading can be switched so that equation (4) below is true.

$$(Pe2/Pe1) \geq (Pave2 \times \text{Mod}2)/(Pave1 \times \text{Mod}1) \geq 1 \quad (4)$$

Alternatively, if the average read power is not changed, the light modulation rate can be selected to satisfy equation (3) below.

$$(Pe2/Pe1) \geq (\text{Mod}1/\text{Mod}2) \geq 1 \quad (3)$$

A suitable processing device can be used to set the light modulation rate according to the linear velocity to satisfy the foregoing equations after determining the maximum reading speed of the medium. Alternatively, the light modulation rate could be set for each linear velocity setting according to the media type, and this information could be stored in the reading device for selection together with the linear velocity used for reading.

Further alternatively, the discrimination unit of the reading device could read information that is prerecorded to the optical disc and set the light modulation rate based on this information according to the linear velocity. For example, the erase power for writing spaces at each linear velocity could be stored on the optical disc, or the average read power (reproducing power) at each linear velocity could be prerecorded on the disc.

Further alternatively, the light modulation rate to be used at each linear velocity could be prerecorded on the optical disc. In this case the high frequency modulation controller 106 of the reading device sends a control signal to the high frequency modulator 107 to achieve a light modulation rate equal to or near the value read from the disc.

The laser beam used for reading can thus be prevented from erasing recording marks by changing the light modulation rate of the high frequency modulated laser according to the linear velocity. The error rate of the reproduced signal can also be improved by compensating for a drop in the S/N ratio of the reproduced signal. The invention thus prevents degrading the reliability of the recording marks.

The present invention is described above as a method and reading device for reading a BD-RE disc. The invention is not limited to reading only BD-RE media, however, and can also be used with other types of optical disc media, including DVD-RAM, DVD-RW, and CD-RW. Furthermore, the present invention can be applied to a write-once type recording disc, such as BD-R, DVD-R or CD-R, or to a read-only type disc, such as BD-ROM, DVD-ROM. Also, when the present invention is applied to an optical disc for use with blue or blue-purple laser having a wavelength of about 405 nanometers and numerical aperture NA=0.65 to 0.85, which has a recording density higher than an optical disc for use with red laser having a wavelength of about 650 nanometers and numerical aperture NA=0.60 to 0.65, the size of the laser beam spot is very small and the optical energy density per a unit area on the disc recording surface is very high. Thus, the deterioration of the reproducing laser beam can be prevented.

The values Lv1 and Lv2 described above can be suitably selected according to the media type. With Blu-Ray disc media, for example, Lv1 and Lv2 can be 1× and 4×. With DVD media such as DVD-RAM, Lv1 and Lv2 can be 2× and 5×, or 1× and 16×, for example. Whatever the media, Lv1 and Lv2 are set to the minimum linear velocity enabling reading and the maximum linear velocity enabling reading the medium.

Alternatively, if information can be read from the medium at three or more speeds, such as 1×, 2× and 4×, Lv1 and Lv2 could be set to 1× and 4×, or to 1× and 2×, or to 2× and 4×, for example.

The reading and writing device described in FIG. 1 can also be rendered as a device having only the functions of a disc reader.

When the spindle motor is driven at a linear velocity four or more times the minimum linear velocity (1×) of the loaded optical disc, this embodiment of the invention can be rendered to change the laser power (average read power) when the disc is first loaded and change the light modulation rate of the high frequency modulated laser beam.

When the linear velocity is changed from 1× to 4×, this embodiment of the invention changes the average read power of the laser and changes the light modulation rate of the laser.

Alternatively, however, when the linear velocity is changed by a relatively small multiple, such as from 1× to 2×, it may take time for the learning operation that readjusts the electrical circuit offset of the reproduced signal processor and the servo controller by increasing the average read power (reproducing power). To save this time in this case, the average read power could be not changed.

More specifically, this aspect of the invention changes only the average read power or the light modulation rate instead of changing both. The light modulation rate is changed while holding the average read power constant while reading, for example. The startup time or the linear velocity switching time can therefore be shortened in this case because learning the circuit offset accompanying a significant change in the electrical signal gain caused by a change in the average read power can be omitted.

Referring to Table 2, when the linear velocity is changed from 4× to 2×, for example, the average read power is changed from 0.60 mW to 0.35 mW and the light modulation rate is changed from 4.0 to 7 in the embodiment described above. In this aspect of the invention, however, the average read power is held steady at 0.60 mW and the light modulation rate is changed from 4.0 to a smaller value such as 3.5. When the linear velocity is changed from 4× to 8× or when the linear velocity increases gradually as in the CAV control, for example, the average read power is changed from 0.60 mW to 0.80 mW and the light modulation rate is changed from 4.0 to 3.5 in the 0.80 mW and the light modulation rate is changed from 4.0 to 3.5 in the embodiment described above. In this aspect of the invention, however, the average read power is held steady at 0.60 mW and the light modulation rate is changed from 4.0 to a larger value such as 6.0 or changed gradually in relation to the linear velocity change.

In a variation of the above embodiment the light modulation rate changes according to the linear velocity. More preferably, when the linear velocity increases from a linear velocity above a certain level (particularly above 4×), the average read power is held constant while the modulated current amplitude is set so that the light modulation rate increases.

Another embodiment of the invention is described next. When the selected linear velocity increases as the laser spot moves closer to the outside circumference of the recording medium and the linear velocity deviates from a set linear velocity that is a specific multiple of the reference linear velocity, the median between the light modulation rate for one set linear velocity and the light modulation rate for the next set linear velocity is calculated. If the selected linear velocity is a constant angular velocity (CAV), the linear velocity increases closer to the outside circumference side of the recording medium. If the linear velocity at the inside circumference of a CAV medium is 4×, the linear velocity at the outside circumference will be 8× or greater. In this case the linear velocity changes linearly from the inside circumference to the outside circumference. Furthermore, while the light modulation rate for preset linear velocities such as 1×, 2×, 4×, 8×, and 12× (referred to as "set linear velocity") can be read from Table 2, for example, the light modulation rates for linear velocities that deviate from one of these set linear velocities are not provided. In this situation the median between the light modulation rate (4.0 in this example) for one set linear velocity (4× in this example) and the light modulation rate (3.5) for the next set linear velocity (8× in this example) is calculated. The median can be based on the internally divided ratio.

As will be known from the above description, when any same disc can be read and recorded at a plurality of linear velocities, the average read power (read power) must be adjusted so that signals can be appropriately reproduced at the selected linear velocity. BD-RE media that can be read and written at speeds ranging from 1× to 4×, for example, the transfer rate during recording or writing can be increased by driving the spindle motor faster. However, when the rotational speed rises, the bandwidth of the reproduced signal from the optical disc increases and the S/N ratio of the reproduced signal decreases. To improve the S/N ratio of the reproduced signal, the average read power is increased when the disc is rotating at a high linear velocity. Data relating to the average read power and the frequency and amplitude of the modulated current that are applicable to each usable linear velocity, such as 1×, 2× and 4×, can be stored in the reading and writing device during the manufacturing process, and this data can be used to adjust the average read power. Alternatively, disc information that is prerecorded to each optical disc can be read, and the average read power can be adjusted by selecting and setting from among a plurality of prerecorded conditions the conditions that are closest to the read value.

The average read power setting also depends on the reading durability of the recording medium. When the average read power rises the focused laser beam heats the recording film, the temperature can rise above the crystallization point, and the recording film can change phase to the crystal state. More specifically, a laser beam emitted at a high average read power level when reading can erase the recording marks. However, when the disc speed increases the laser power emitted in a unit area per unit time decreases and the heat energy imparted by the laser beam drops. It is therefore effective to increase the average read power when reading proportionally to the multiple of the linear velocity raised to the ½-1 power. The recording marks can also deteriorate when the peak laser power is high.

Deterioration of the recording marks caused by reading depends in part on the material of the recording film, but damage is largely affected by two parameters, erasing with a high average read power and a high peak laser power. To prevent the laser beam used for reading from erasing (damaging) the recording marks, the power of the laser beam used for reading must be less than laser power that melts the recording film. The reading method of the present invention therefore lowers the light modulation rate Mod, which is the ratio of the peak power Pp and the average read power Pave of the laser output. This reduces degradation of the recording marks caused by the laser beam used for reading.

The embodiments of the invention described above change the modulation rate of the modulated current so that the light modulation rate changes according to the linear velocity used for reading, and thereby improves the S/N ratio by increasing the bandwidth of the reproduced signal.

The invention is also not limited to phase change optical disc media, and can also be used with media such as magneto-optical discs that record data using magnetic polarity, write-once media that use a dyed recording film, and discs such as read-only media that record data using pits and lands formed in the disc substrate. The invention can also be used with media that use combinations of different recording methods. In any case, the same effect is achieved by changing the modulation of the modulated current so that the light modulation rate changes according to the linear velocity.

Furthermore, the light modulation rate of the high frequency modulated laser beam used at the same linear velocity can be different on optical disc media that have a single data recording layer and media that have two data recording layers.

On a dual layer disc data is read from the layer that is farther from the side to which the laser beam is incident by light that passes through the first layer (the layer closer to the surface). If the transmittance of the surface layer is 50%, the power of the layer incident to the second layer is the same as the laser power used to read a single-layer disc if the average read power is doubled. However, if the transmittance of the surface layer is greater than 50%, the energy of the emitted laser beam is greater that the energy emitted to a single-layer disc. Therefore, by changing both the read power and the light modulation rate of the emitted laser beam used to read a dual layer disc and a single layer disc, optimum signal quality can be achieved and information can be reliably reproduced from both types of discs.

More specifically, the invention also affords a method of reading information recorded to each of the recording layers of an optical data recording medium that has a plurality of independently recordable recording layers by emitting the laser beam so that the light modulation rate changes according to the position of the recording layer.

The invention also affords a reading device that can read information recorded to each of the recording layers of an optical data recording medium (Mm) that has a plurality of independently recordable recording layers, can read information recorded to an optical data recording medium (Ms) that has only one recording layer, and has a high frequency modulation controller that controls the light modulation rate when reading information recorded to any one of the recording layers of the multilayer recording medium (Mm) so that the light modulation rate differs according to the position of the one recording layer from the light modulation rate used to read a single-layer recording medium (Ms).

Modulation of the high frequency current can be stopped (modulation=0) when reading or writing the disc with relatively little modulation of the high frequency modulated current. The high frequency modulation controller controls the high frequency modulator by a simple on/off control in this case, and the arrangement of the high frequency modulation controller can therefore be simplified.

INDUSTRIAL APPLICABILITY

The optical data reading method and the reading device implementing the reading method of the invention can be used in digital devices and data processing devices.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

The invention claimed is:

1. A reading method for reading and reproducing information from a recording medium that can be read at a plurality of linear velocities by radiating a laser beam onto the recording medium, the reading method comprising:
   selecting one linear velocity from among the group of plural linear velocities; and
   changing a light modulation rate according to the selected linear velocity where the light modulation rate (Pp/Pave) is a ratio between the peak power (Pp) and the average read power (Pave) of the light intensity of the emitted laser beam, wherein
   the selecting step selects a first linear velocity (Lv1) or a second linear velocity (Lv2) that is at least two times greater than the first linear velocity;
   the light modulation rate for reading at the first linear velocity (Lv1) is a first light modulation rate (Mod1);
   the light modulation rate for reading at the second linear velocity (Lv2) is a second light modulation rate (Mod2);
   the second light modulation rate (Mod2) is lower than the first light modulation rate (Mod1), and
   the first linear velocity (Lv1), the second linear velocity (Lv2), the first light modulation rate (Mod1), and the second light modulation rate (Mod2) are set so that the following equation (1)

$$(Lv2/Lv1)^{1/2} \geq (Mod1/Mod2) \geq 1 \quad (1)$$

is true.

2. A reading method for reading and reproducing information from a recording medium that can be read at a plurality of linear velocities by radiating a laser beam onto the recording medium, the reading method comprising:
   selecting one linear velocity from among the group of plural linear velocities; and
   changing a light modulation rate according to the selected linear velocity where the light modulation rate (Pp/Pave) is a ratio between the peak power (Pp) and the average read power (Pave) of the light intensity of the emitted laser beam, wherein
   the selecting step selects a first linear velocity (Lv1) or a second linear velocity (Lv2) that is at least two times greater than the first linear velocity;
   the light modulation rate for reading at the first linear velocity (Lv1) is a first light modulation rate (Mod1);
   the light modulation rate for reading at the second linear velocity (Lv2) is a second light modulation rate (Mod2);
   the second light modulation rate (Mod2) is lower than the first light modulation rate (Mod1),
   the average read power of the high frequency modulated laser beam for reading at the first linear velocity (Lv1) is a first average read power (Pr1);
   the average read power of the high frequency modulated laser beam for reading at the second linear velocity (Lv2) is a second average read power (Pr2); and
   the first linear velocity (Lv1), the second linear velocity (Lv2), the first light modulation rate (Mod1), the second light modulation rate (Mod2), the first average read power (Pr1), and the second average read power (Pr2) are set so that the following equation (2)

$$(Lv2/Lv1)^{1/2} \geq (Pr2 \times Mod2)/(Pr1 \times Mod1) \geq 1 \quad (2)$$

is true.

3. The reading method as described in claim 1, wherein the recording medium enables reading information at any linear velocity selected from a group including at least the first linear velocity (Lv1) and the second linear velocity (Lv2),
   the first light modulation rate (Mod1) and the second light modulation rate (Mod2) are prerecorded to the recording medium, and
   the reading method further comprises a step of:
   reading the light modulation rate information from the recording medium.

4. A reading method for reading and reproducing information from a recording medium that can be read at a plurality of linear velocities by radiating a laser beam onto the recording medium, the reading method comprising:
   selecting one linear velocity from among the group of plural linear velocities; and
   changing a light modulation rate according to the selected linear velocity where the light modulation rate (Pp/Pave) is a ratio between the peak power (Pp) and the average read power (Pave) of the light intensity of the emitted laser beam, wherein
   the selecting step selects a first linear velocity (Lv1) or a second linear velocity (Lv2) that is at least two times greater than the first linear velocity;
   the light modulation rate for reading at the first linear velocity (Lv1) is a first light modulation rate (Mod1);
   the light modulation rate for reading at the second linear velocity (Lv2) is a second light modulation rate (Mod2);
   the second light modulation rate (Mod2) is lower than the first light modulation rate (Mod1),
   the erase power for recording spaces at the first linear velocity (Lv1) is a first erase power (Pe1);
   the erase power for recording spaces at the second linear velocity (Lv2) is a second erase power (Pe2); and
   the first light modulation rate (Mod1), the second light modulation rate (Mod2), the first erase power (Pe1), and the second erase power (Pe2) are set so that the following equation (3)

$$(Pe2/Pe1) \geq (Mod1/Mod2) \geq 1 \quad (3)$$

is true.

5. A reading method for reading and reproducing information from a recording medium that can be read at a plurality of linear velocities by radiating a laser beam onto the recording medium, the reading method comprising:

selecting one linear velocity from among the group of plural linear velocities; and changing a light modulation rate according to the selected linear velocity where the light modulation rate (Pp/Pave) is a ratio between the peak power (Pp) and the average read power (Pave) of the light intensity of the emitted laser beam, wherein the selecting step selects a first linear velocity (Lv1) or a second linear velocity (Lv2) that is at least two times greater than the first linear velocity;

the light modulation rate for reading at the first linear velocity (Lv1) is a first light modulation rate (Mod1);

the light modulation rate for reading at the second linear velocity (Lv2) is a second light modulation rate (Mod2);

the second light modulation rate (Mod2) is lower than the first light modulation rate (Mod1), the average read power of the laser beam for reading at the first linear velocity (Lv1) is a first average read power (Pr1);

the average read power of the laser beam for reading at the second linear velocity (Lv2) is a second average read power (Pr2);

the erase power for recording spaces at the first linear velocity (Lv1) is a first erase power (Pe1);

the erase power for recording spaces at the second linear velocity (Lv2) is a second erase power (Pe2); and the first light modulation rate (Mod1), the second light modulation rate (Mod2), the first average read power (Pr1), the second average read power (Pr2), the first erase power (Pe1), and the second erase power (Pe2) are set so that the following equation (4)

$$(Pe2/Pe1) \geq (Pr2 \times Mod2)/(Pr1 \times Mod1) \geq 1 \qquad (4)$$

is true.

6. The reading method as described in claim 4, wherein the recording medium enables reading information at any linear velocity selected from a group including at least the first linear velocity (Lv1) and the second linear velocity (Lv2), and the first erase power (Pe1) and the second erase power (Pe2) are prerecorded to the recording medium, and the reading method further comprises a step of:
reading the erase power information from the recording medium.

7. The reading method as described in claim 1, wherein the ratio (Lv2/Lv1) between the first linear velocity (Lv1) and the second linear velocity (Lv2) is at least 4, and the light modulation rate changes according to the linear velocity.

8. A recording medium that is read by the reading method as described in claim 1, wherein the recording medium is a rewritable or a write-once medium.

9. The reading method as described in claim 1, further comprising a step of:
reading the light modulation rate from a table when the selected linear velocity is substantially constant in all areas of the recording medium.

10. A reading method for reading and reproducing information from a recording medium that can be read at a plurality of linear velocities by radiating a laser beam onto the recording medium, the reading method comprising:

selecting one linear velocity from among the group of plural linear velocities;

changing a light modulation rate according to the selected linear velocity where the light modulation rate (Pp/Pave)
is a ratio between the peak power (Pp) and the average read power (Pave) of the light intensity of the emitted laser beam, and calculating the median between the light modulation rate for one set linear velocity and the light modulation rate for the next set linear velocity to determine the light modulation rate for a linear velocity that deviates from a set linear velocity that is a specific multiple of a reference linear velocity when the selected linear velocity is a linear velocity that increases with proximity to the outside circumference edge of the recording medium.

11. The reading method as described in claim 2, wherein the recording medium enables reading information at any linear velocity selected from a group including at least the first linear velocity (Lv1) and the second linear velocity (Lv2), the first light modulation rate (Mod1) and the second light modulation rate (Mod2) are prerecorded to the recording medium, and the reading method further comprises a step of:
reading the light modulation rate information from the recording medium.

12. The reading method as described in claim 2, wherein the ratio (Lv2/Lv1) between the first linear velocity (Lv1) and the second linear velocity (Lv2) is at least 4, and the light modulation rate changes according to the linear velocity.

13. A recording medium that is read by the reading method as described in claim 2, wherein the recording medium is a rewritable or a write-once medium.

14. The reading method as described in claim 2, further comprising a step of:
reading the light modulation rate from a table when the selected linear velocity is substantially constant in all areas of the recording medium.

15. The reading method as described in claim 4, wherein the ratio (Lv2/Lv1) between the first linear velocity (Lv1) and the second linear velocity (Lv2) is at least 4, and the light modulation rate changes according to the linear velocity.

16. A recording medium that is read by the reading method as described in claim 4, wherein the recording medium is a rewritable or a write-once medium.

17. The reading method as described in claim 4, further comprising a step of:
reading the light modulation rate from a table when the selected linear velocity is substantially constant in all areas of the recording medium.

18. The reading method as described in claim 5, wherein the recording medium enables reading information at any linear velocity selected from a group including at least the first linear velocity (Lv1) and the second linear velocity (Lv2), and the first erase power (Pe1) and the second erase power (Pe2) are prerecorded to the recording medium, and the reading method further comprises a step of:
reading the erase power information from the recording medium.

19. The reading method as described in claim 5, wherein the ratio (Lv2/Lv1) between the first linear velocity (Lv1) and the second linear velocity (Lv2) is at least 4, and the light modulation rate changes according to the linear velocity.

20. A recording medium that is read by the reading method as described in claim 5, wherein the recording medium is a rewritable or a write-once medium.

21. The reading method as described in claim 5, further comprising a step of:
reading the light modulation rate from a table when the selected linear velocity is substantially constant in all areas of the recording medium.

22. The reading method as described in claim 10, wherein the recording medium enables reading information at any linear velocity selected from a group including at least the first linear velocity (Lv1) and the second linear velocity (Lv2), and the first erase power (Pe1) and the second erase power (Pe2) are prerecorded to the recording medium, and the reading method further comprises a step of:

reading the erase power information from the recording medium.

23. The reading method as described in claim 10, wherein the ratio (Lv2/Lv1) between the first linear velocity (Lv1) and the second linear velocity (Lv2) is at least 4, and the light modulation rate changes according to the linear velocity.

24. A recording medium that is read by the reading method as described in claim 10, wherein the recording medium is a rewritable or a write-once medium.

25. The reading method as described in claim 10, further comprising a step of:

reading the light modulation rate from a table when the selected linear velocity is substantially constant in all areas of the recording medium.

* * * * *